(12) United States Patent
Wang

(10) Patent No.: US 11,907,954 B2
(45) Date of Patent: Feb. 20, 2024

(54) TRANSACTION ANOMALY DETECTION

(71) Applicant: PayPal, Inc., San Jose, CA (US)

(72) Inventor: Hewen Wang, Singapore (SG)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/240,247

(22) Filed: Apr. 26, 2021

(65) Prior Publication Data

US 2022/0343329 A1    Oct. 27, 2022

(51) Int. Cl.
  *G06Q 20/40*    (2012.01)
  *G06N 20/00*    (2019.01)
  *H04L 9/40*    (2022.01)

(52) U.S. Cl.
  CPC ......... *G06Q 20/4016* (2013.01); *G06N 20/00* (2019.01)

(58) Field of Classification Search
  CPC .................... G06Q 20/4016; G06N 20/00
  See application file for complete search history.

(56) References Cited

U.S. PATENT DOCUMENTS

| | | | |
|---|---|---|---|
| 8,234,297 B2 * | 7/2012 | He | G06F 16/24556 707/770 |
| 9,275,340 B2 | 3/2016 | Patil et al. | |
| 9,953,160 B2 | 4/2018 | Sharma et al. | |
| 2019/0050928 A1 | 2/2019 | Tedesco et al. | |
| 2019/0164164 A1 * | 5/2019 | Karambakkam | G06N 5/043 |
| 2020/0167784 A1 * | 5/2020 | Kursun | G06Q 20/4016 |
| 2021/0174366 A1 * | 6/2021 | Zeng | G06Q 20/405 |
| 2021/0406896 A1 * | 12/2021 | Chaturvedi | G06V 10/82 |

OTHER PUBLICATIONS

Security engineering, Wikipedia; https://en.wikipedia.org/w/index.php?title=Security_engineering&oldid=1017168910; last edited on Apr. 11, 2021, 5 pages. [Retrieved Oct. 15, 2021].

(Continued)

*Primary Examiner* — Bennett M Sigmond
*Assistant Examiner* — Bhavin D Shah
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed in which a computer system generates a transaction network graph from an initial set of transactions including known labels and attributes. The computer system may generate first and second matrices using first and second graph embedding routines from a training set of transactions that includes a first subset of transactions in the network graph. The first routine is based on anomalies in related transactions occurring at nodes in the transaction network graph that are multiple hops away while the second routine is based on anomalies in neighborhoods of similar transactions. In some embodiments, the computer system generates a final embedded matrix from the first and second matrices and uses the final matrix and a testing set of transactions that includes a second subset of transactions in the graph to train a machine learning model, where the trained model usable to determine whether unlabeled transactions are anomalous.

20 Claims, 7 Drawing Sheets

(56) References Cited

OTHER PUBLICATIONS

Ross Anderson, Security Engineering: A Guide to Building Dependable Distributed Systems, 2nd edition, 0470068523, "Chapter 1: What Is Security Engineering?" (Apr. 14, 2008), pp. 3-15.
Ron Ross, et al., "Systems Security Engineering: Considerations for Multidisciplinary Approach in the Engineering of Trustworthy Secure Systems," National Institute of Standards and Technology, U.S. Department of Commerce, Published Nov. 2016, 261 pages.

* cited by examiner

| Weight Matrix 252 | | | | |
|---|---|---|---|---|
| | Node A | Node B | Node C | Node D |
| Node A | 0 | 1 | 7 | 3 |
| Node B | 5 | 0 | 5 | 2 |
| Node C | 10 | 2 | 0 | 5 |
| Node D | 3 | 1 | 1 | 0 |

```
                                                                    Method
                                                                     500
```

Generate a transaction network graph from an initial set of transactions with transaction attributes, where transactions in the initial set of transactions include known labels.
510

Generate, from a training set of transactions using a first graph embedding routine, a first transaction matrix, where the first graph embedding routine is based on anomalies in related transactions occurring at one or more nodes in the transaction network graph that are one or more hops away, and where the training set includes a first subset of transactions in the transaction network graph.
520

Generate, from the training set of transactions using a second, different graph embedding routine, a second transaction matrix, where the second, different graph embedding routine is based on anomalies in neighborhoods of similar transactions.
530

Generate a final embedded matrix from the first transaction matrix and the second transaction matrix, where one or more attributes of transactions in the final embedded matrix differ from attributes of corresponding transactions in the training set of transactions.
540

Train, using the final embedded matrix and a testing set of transactions that includes a second, different subset of transactions in the transaction network graph, a machine learning model.
550

Determine, using the trained machine learning model, whether one or more unlabeled transactions are anomalous.
560

*Fig. 5*

*Method 600*

Determine, using a trained machine learning model, whether one or more unlabeled transactions are anomalous.
610

Generate a transaction network graph from an initial set of transactions with transaction attributes, where transactions in the initial set of transactions include known labels.
620

Generate, from a training set of transactions using a first graph embedding routine, a first transaction matrix, where the first graph embedding routine is based on anomalies in related transactions occurring at one or more nodes in the transaction network graph that are one or more hops away, and where the training set includes a first subset of transactions in the transaction network graph.
630

Generate, from the training set of transactions using a second, different graph embedding routine, a second transaction matrix, where the second, different graph embedding routine is based on anomalies in neighborhoods of similar transactions.
640

Generate a final embedded matrix from the first transaction matrix and the second transaction matrix, where one or more attributes of transactions in the final embedded matrix differ from attributes of corresponding transactions in the training set of transactions.
650

Input the final embedded matrix into the machine learning model and adjusting weights of the model based on output of the model for the final embedded matrix.
660

*Fig. 6*

TRANSACTION ANOMALY DETECTION

BACKGROUND

Technical Field

This disclosure relates generally to transaction processing, and, more specifically, to techniques for automatically detecting anomalous transactions e.g., for transaction security.

Description of the Related Art

As more and more transactions are conducted electronically via online transaction processing systems, for example, these processing systems become more robust in detecting suspicious and/or unusual behavior associated with such transactions. As the volume of online transactions increases, the scale for loss (e.g., financial) increases. In addition, entities participating in such transactions may lose trust in the systems processing the transactions if fraudulent transactions are allowed to proceed, causing these systems to incur further loss. Many transaction systems attempt to detect anomalies in transactions in order to prevent such loss.

BRIEF DESCRIPTION OF THE DRAWINGS

FIG. 5 is a flow diagram illustrating a method for training a machine learning model using embedded transaction data, according to some embodiments.

FIG. 6 is a flow diagram illustrating a method for using a machine learning model trained using embedded transaction data, according to some embodiments.

DETAILED DESCRIPTION

Figure 1:
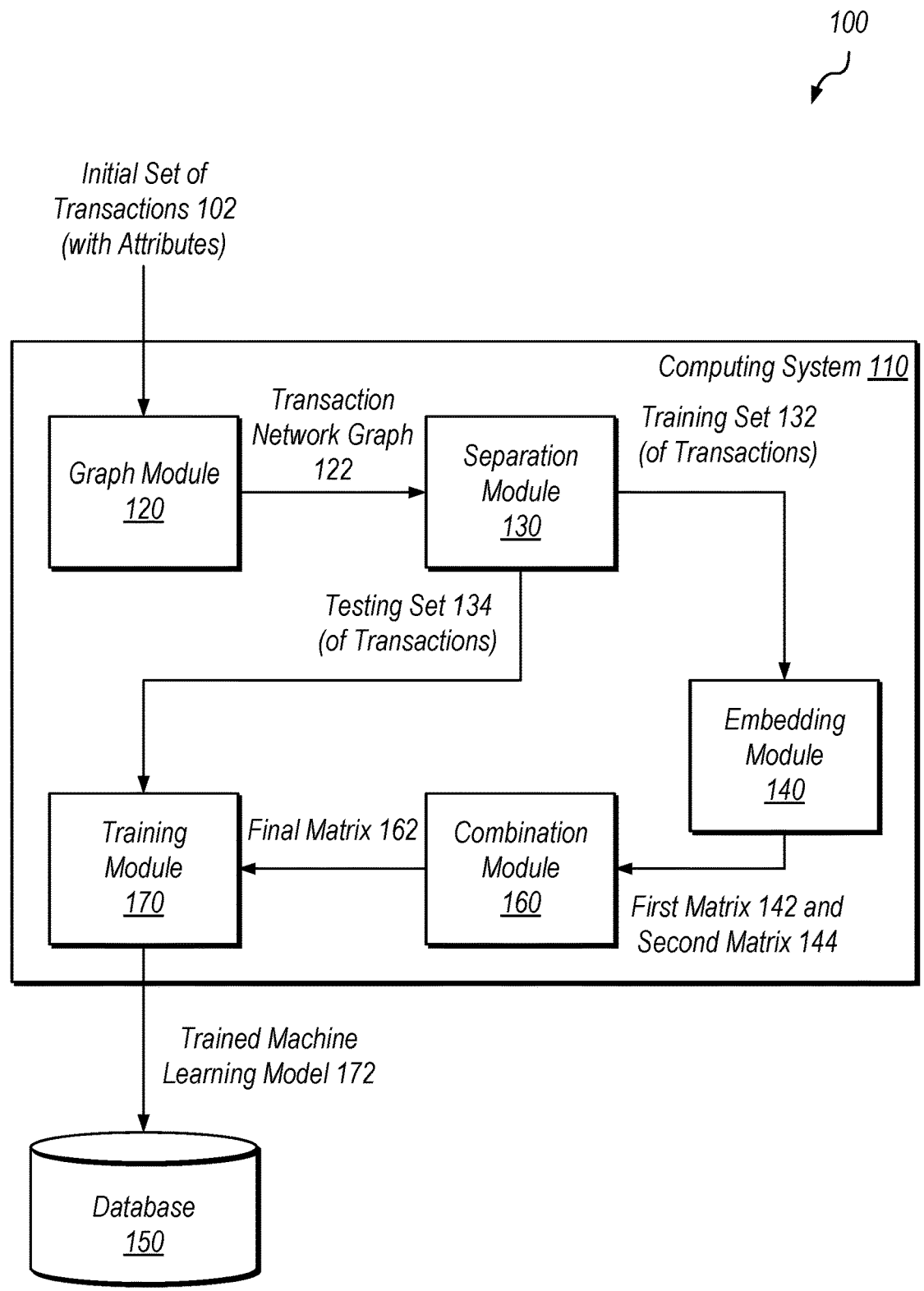
FIG. 1 is a block diagram illustrating an example computer system configured to embed transaction data for use in training a machine learning model, according to some embodiments.

Transaction processing systems often perform risk analyses of transactions using various anomaly detection methods. For example, transaction processing systems are generally configured to identify unusual characteristics associated with the millions of transactions they process daily. Such anomaly detection methods, however, are often difficult to scale for transactions with large numbers of attributes (e.g., transaction type, location, monetary value, IP address, consumer identifier, merchant identifier, etc.) or if they are scalable, they are less accurate than non-scalable methods. The inefficiency of traditional transaction processing systems is compounded by the sheer volume of transaction data available for training systems to use when training models to detect anomalous behavior.

Further, such anomaly detection methods often fail to identify and model interactions between entities involved in different, but related transactions. For example, traditional systems often do not model interactions in which goods or services passed through a chain of transactions attempt to hide some form of fraudulent behavior. As one specific example, a first entity may transact with a second entity which transacts with a third entity (e.g., where the goods, services, or money are exchanged in each transaction). The first transaction between the first and second entity may not appear suspicious, but is indeed suspicious based on its association with the second transaction between the second and third entity. In this example, there is an identifiable pattern, however, traditional transaction evaluation techniques often fail to identify this pattern as they are trained to process transactions in isolation of one another.

In addition, traditional techniques fail to identify anomalous attributes of a given transaction based on the given transaction differing from its neighbors (e.g., by observing attributes of transactions initiated by similar users to the user initiating the given transaction i.e., users in this user's "neighborhood"). That is, traditional techniques typically evaluate a transaction based on comparing its attributes with attributes that are generally associated with suspicious behavior rather than observing if the transaction has different attributes than similar transactions in its neighborhood of transactions.

As used herein, the term "related transactions" refers to two or more transactions that share at least one attribute and that are connected to one another in some manner, within the context of a transaction network graph by a chain of one or more transactions. For example, a first transaction that occurs between a first node and a second node is related to a second, different transaction that occurs between a third node and a fourth node if the second and third nodes are connected (i.e., they both participate) in a third transaction. In this example, the three different transactions result in a chain of transactions between four different nodes. Further in this example, the three transactions participate in passing money from a first user down a line of several users via multiple transactions and, as such, these transactions share at least a monetary value attribute. As used herein, the term "similar transactions" refers to two or more transactions that share multiple attributes. For example, similar transactions have the same or substantially the same attributes. As one specific example, a first and second transaction may occur in the same geographic location, occur in the same language, be conducted with the same merchant, etc., but may be conducted using different currencies. Related transactions and similar transactions are discussed in further detail below with reference to FIG. 3.

The disclosed techniques provide both scalable and accurate transaction risk assessment. In particular, the disclosed techniques generate a transaction network graph from transaction data and then embed transactions included in the graph prior to using the transaction data to train machine learning models to detect anomalous behavior in transactions as they are received for processing. The disclosed graph embedding techniques are used to preprocess transaction data such that it is in a lower-dimensional space than in its original form. Further, the disclosed graph embedding techniques account for anomalies in related transactions occurring at one or more nodes in a transaction network graph that are multiple hops (e.g., nodes) away and anomalies in neighborhoods of similar transactions. As a few specific examples, the disclosed graph embedding techniques attempt to identify patterns in: money movement (e.g., identity collusion or money laundering), suspicious assets (e.g., assets that are connection to a large amount of money, an asset that is connection to multiple transactions that cause loss, etc.), linking to suspicious entities, popularity of certain merchants or domains with different users, etc.

In some embodiments, the disclosed techniques include employing both top k personalized page rank (TopkPPR) embedding techniques as well as neighborhood-based embedding techniques are used to prepare transaction data. The TopkPPR techniques attempt to capture anomaly information for a given node within a transaction network graph (e.g., anomalies in multi-transaction hops), while the neighborhood-based embedding techniques attempt to capture anomaly information within a given neighborhood of nodes (e.g., anomalous transactions within a neighborhood of nodes participating in similar transactions).

Various different transaction scenarios may cause loss for a transaction processing system facilitating electronic transaction if these transactions are not identified prior to execution (e.g., a system processing online transactions between consumers and merchants). As one specific example, a transaction may be categorized as an unconfirmed service by a consumer after execution of the transaction. In this example, a merchant sells an item, the consumer files a complaint such as "item not received," and the transaction processing service re-funds the consumer taking on the financial burden of the refund. As another specific example, a transaction may be categorized as fraudulent after it has already been processed and complete (e.g., funds have already been transferred). In this example scenario, after execution, a transaction may be identified as being associated with an account takeover, stolen financial information, made up items, false complaints, etc. Each of these various situations may cause the transaction processing system to incur financial loss. As yet another specific example, an online merchant may respond to a customer's complaint (such as item not received), but the online merchant does not actually resolve the customer's complaint (the merchant does not send a replacement item). In this scenario, the transaction processing system often has to take responsibility of the lost item and reimburse the customer (even though it looked like the merchant assumed the financial responsibility).

The disclosed use of graph embedding techniques in combination with machine learning models may advantageously identify and prevent any of the various different transaction scenarios discussed above. For example, the graph embedding techniques may map different patterns of suspicious behavior in a computationally efficient manner. This mapped information can then be used to train a transaction classifier to identify such patterns prior to processing transactions. Further, the disclosed techniques improve transaction processing by increasing the number of transactions that are able to be processed at any given time as well as increasing the accuracy with which the transaction processing system detects suspicious behavior (e.g., fraudulent transactions). This, in turn, may prevent or reduce loss (e.g., financial loss) associated with such transactions. As one specific example, the time complexity for transaction feature processing requires a linear amount of time, allowing for the use of a large transaction dataset. In this specific example, the time complexity for determining feature vectors for transactions may be represented by $O(k*n+m)$, where O is the big O notation, k is a constant, n is the number of nodes, and m is the number of transactions.

Example Training System

FIG. 1 is a block diagram illustrating an example computer system configured to embed transaction data for use in training a machine learning model. In the illustrated embodiment, system 100 includes a database 150 and computing system 110, which in turn includes graph module 120, separation module 130, embedding module 140, combination module 160, and training module 170.

Computing system 110, in the illustrated embodiment, receives an initial set 102 of transactions that include transaction attributes and known labels. For example, a transaction processing system may send previously processed transactions which are known to be either good transactions or fraudulent transactions to computer system 110. These transactions are labeled good or fraud, for example, based on fraud reports from users after transactions have been processed. Transactions in the initial set 102 of transactions include various different attributes, such as a transaction location, currency, one or more entities involved in the transaction, internet protocol (IP) addresses of devices involved in the transaction, etc.

Computer system 110, in the illustrated embodiment, trains a machine learning model and stores this trained machine learning model 172 in database 150 for use by a transaction processing system. In other embodiments, computing system 110 trains a machine learning model and then executes this model to predict whether new, unlabeled transactions are anomalous. Based on predictions output by the trained machine learning model 172, computing system 110 may approve a transaction, reject a transaction, or send a transaction for further processing. In still other embodiments, computing system 110 sends trained machine learning model 172 to another computing system configured to process transactions.

Figure 3:
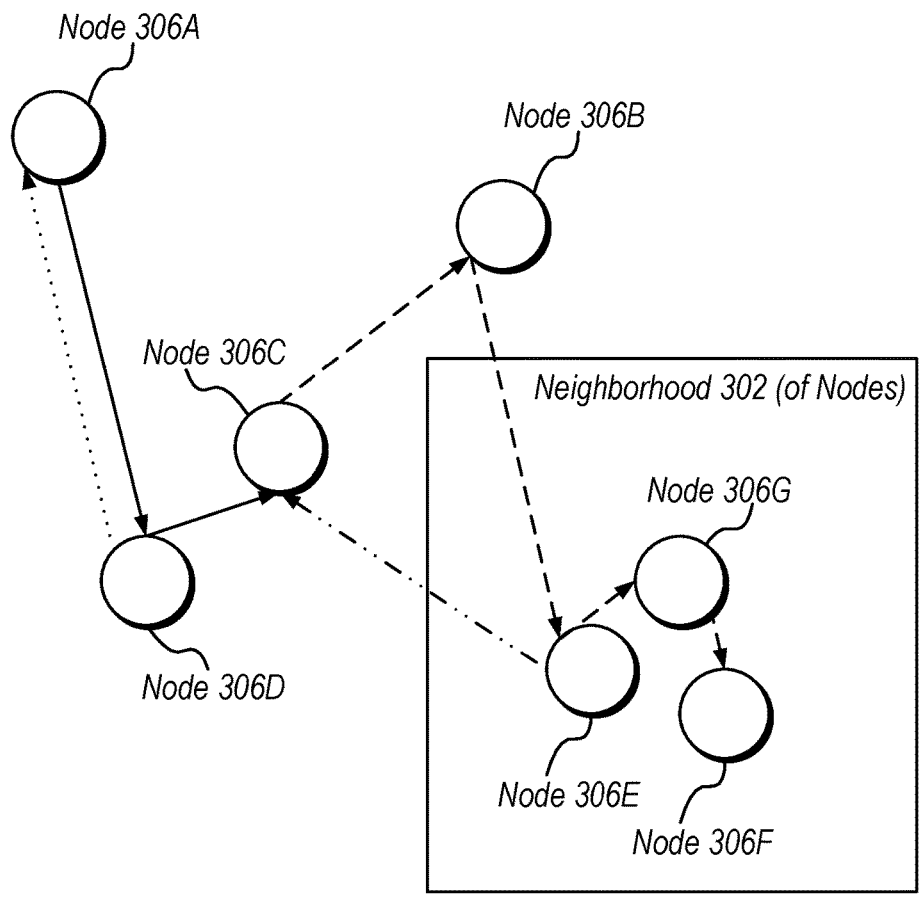
FIG. 3 is a diagram illustrating an example transaction network graph, according to some embodiments.

Graph Module 120, in the illustrated embodiment, generates a transaction network graph 122 from the initial set 102 of transactions and sends this graph to separation module 130. For example, graph module 120 generates a graph that represents transactions in the initial set 102 with lines connecting nodes that represent entities involved in the transactions. The lines within transaction network graph 122 may be referred to as edges. As such, the transaction network graph 122 includes the same number of lines as the number of transactions included in the initial set 102. As one specific example, a transaction between a merchant and a user is represented within graph 122 by a line segment between a merchant node and a user node. FIG. 3, described in detail below, provides an example of transaction network graph 122. Within the transaction network graph 122, each node includes an entity identifier (ID) for the entity associated with that node. As one specific example, a consumer ID or merchant ID is assigned to each of two nodes based on the consumer or merchant involved in a given transaction between the two nodes.

Separation module 130 sorts transactions included in transaction network graph 122 into a training set 132 of transactions and a testing set 134 of transactions based on timestamps associated with these transactions. For example, separation module 130 selects transactions with newer timestamps for the testing set 134 and selects transactions with older timestamps for the training set 132. Separation module 130 then provides the training set 132 of transactions to embedding module 140 and the testing set 134 of transactions to training module 170.

Embedding module 140, in the illustrated embodiment, generates a first embedded matrix 142 and a second embedded matrix 144 from training set 132. Embedding module 140 generates the first matrix 142 using a first graph embedding routine that accounts for anomalies in related transactions occurring at one or more nodes in the transaction network graph 122 that are one or more hops away from a currently evaluated node. For example, the first graph embedding routine includes a personalized page rank determination. Specifically, the disclosed techniques include a top k personalized page rank (TopkPPR) determination for nodes in graph 122 e.g., based on a number of transactions that this node participates in. The first graph embedding routine measures relationships between different nodes (e.g., destination entities) in the transaction network graph 122 with a given current node (e.g., a source entity). Said another way, the first graph embedding routine observes the relationship between transactions initiated at a current node and transactions occurring between other nodes in the transaction network graph that are multiple transaction hops away.

In contrast to the first edge embedding routine, embedding module 140 generates the second embedded matrix 144 using a second, different graph embedding routine that accounts for anomalies in neighborhoods of similar transactions within transaction network graph 122. For example, the second graph embedding routine accounts for anomalous transaction attributes by observing similar transactions within a neighborhood of transactions that have similar or substantially the same attributes. Details for the embedding techniques performed by embedding module 140 are discussed in further detail below with reference to FIG. 2.

As used herein, the term "embedding" refers to the manipulation of data included in a graph to produce a low-dimensional representation of the graphed data. For example, graph embedding may be used to transform the nodes, edges, and edge attributes included in transaction network graph 122 into a vector space (lower-dimensional space) while preserving properties of the graph. An embedded version of transaction network graph 122 includes vectors of transactions included in the graph, where a given vector corresponds to a given transaction in the graph. Transactions in the graph may include multiple attributes and these attributes will be included in the embedded vector representation of the transaction. Example graph embedding techniques include DeepWalk, node2vec, structural deep network embedding (SDNE), graph2vec, etc.

Combination module 160 receives first matrix 142 and second matrix 144 from embedding module 140 and generates a final embedded matrix 162. Combination module 160 generates final matrix 162 by concatenating the first matrix 142 with the second matrix 144. For example, each row in matrices 142 and 144 represents a transaction, while the columns indicate one or more of various attributes, features, and labels for the transaction rows. Combination module 160 horizontally concatenates matrices 142 and 144 such that the number of rows in the final matrix is equal to the number of rows in matrices 142 and 144, while the number of columns in the final matrix is equal to the sum of the number of columns of matrices 142 and 144.

In this way, final embedded matrix 162 includes a single version of each transaction in the training set 132 of transactions with features from both matrix 142 and matrix 144 (e.g., twice the number of features as corresponding transactions in training set 132). Specifically, a given transaction in the final matrix 162 includes attributes that are weighted a certain way according to this transaction's personalized page rank (according to the first embedding routine) and an aggregation of attributes from transactions in its neighborhood of transactions as well as its own attributes (according to the second embedding routine). In this example, the given transaction may include a larger number of attributes with some attributes that are given greater weight (consideration) when the given transaction is input into a machine learning model than other attributes of the given transaction. Placing transactions and their attributes in matrix form may advantageously allow for more computationally efficient processing than traditional techniques of processing transaction data.

Training module 170 trains a machine learning model using final matrix 162 as a training input. After inputting the final matrix 162 into the machine learning model, training module 170 verifies that the model has been trained properly by inputting transactions in the testing set 134 into the model and observing whether output of the model matches known labels for transactions included in the testing set 134. If the model's predictions match known labels, training module 170 stores the trained machine learning model 172 in database 150 for us in processing future transactions. In some embodiments, training module 170 trains a machine learning classifier that outputs predicted classifications for one or more transactions. In some embodiments, the training performed by module 170 is performed using supervised learning techniques. Training module 170 may train any of various types of machine learning models including neural networks (e.g., graph convolutional network (GCN)), isolation forests, logistic regression, decision trees (e.g., XGBoost), etc. Further details for the training performed by training module 170 are discussed below with reference to FIGS. 4A and 4B.

In this disclosure, various "modules" operable to perform designated functions are shown in the figures and described in detail (e.g., graph module 120, separation module 130, embedding module 140, combination module 160, training module 170, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

Example Embedding Techniques

Figures 2A, 2B:
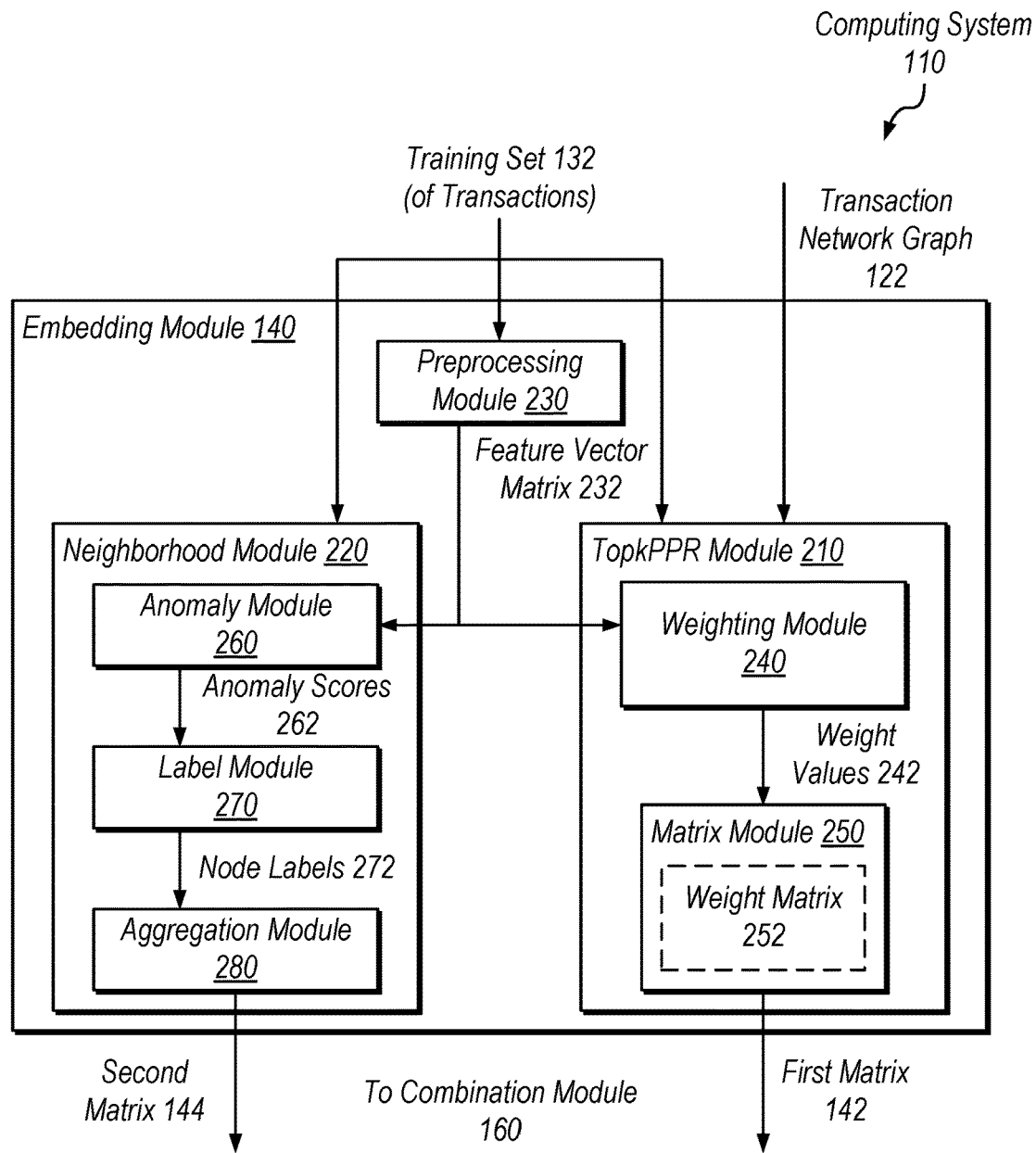
FIG. 2A is a block diagram illustrating an example embedding module, according to some embodiments.
FIG. 2B is a block diagram illustrating an example weight matrix, according to some embodiments.

Turning now to FIG. 2A, a block diagram is shown illustrating an example embedding module. In the illustrated embodiment, computing system 110 includes embedding module 140, which in turn includes a preprocessing module 230, a TopkPPR module 210, and a neighborhood module 220. FIG. 2B illustrates an example of a weight matrix 252 generated in FIG. 2A.

Preprocessing module 230, in the illustrated embodiment, receives training set 132 of transactions (from separation module 130) and performs one or more preprocessing techniques on transactions in the training set in order to generate a matrix 232 of feature vectors from the transactions' attributes. For example, preprocessing module 230 may perform a first data transformation routine on numerical attributes (e.g., transaction amount, a number of days a user account has been registered, account balance, etc.) included in transactions. Preprocessing module 230 may perform a second data transformation routine on categorical attributes (e.g., funding source, customer region, consumer segmentation, merchant segmentation, currency code, etc.) of transactions included in training set 132. The first data transformation routine may be a StandardScalar routine, while the second data transformation routine may be a one-hot encoding routine. These two data transformation routines produce a feature vector of preprocessed attributes for each transaction.

TopkPPR module 210, in the illustrated embodiment, includes a weighting module 240, and a matrix module 250. TopkPPR module 210 receives matrix 232 of feature vectors from preprocessing module 230 and training set 132 of transactions (from separation module 130). TopkPPR module 210 generates first matrix 142 of embedded transactions from feature vector matrix 232 and training set 132. In some embodiments, TopkPPR module 210 executes weighting module 240 to generate weight values 242 for each node in transaction network graph 122 based on a number of transactions included in training set 132 that occur at each of these nodes. For example, if a given node in transaction network graph 122 has ten transactions originating from this node, then the weight value that module 240 assigns to this node is ten. In some embodiments, module 240 assigns a given node a weight value based on the number of transactions that have been labeled as suspicious (e.g., fraudulent).

In other embodiments, weighting module 240 generates multiple weight values 242 for each node. For example, if a particular node has initiated five transactions with a first node and two transactions with a second node in transaction network graph 122, then the particular node will be assigned two different weights (a weight of five relative to the first node and a weight of two relative to the second node). Matrix Module 250, in the illustrated embodiment, generates a matrix of the weight values 242, where each row of the weight matrix 252 represents the source of a transaction (a first entity that initiated the transaction) and each column represents the destination of the transaction (a second entity transacting with the first entity). For example, a given entry in matrix 252 includes a weight value assigned to two different nodes based on the number of transactions that these two nodes participate in with one another. FIG. 2B illustrates an example of the weight matrix 252 generated by matrix module 250 from weight values 242.

Turning back to FIG. 2A, after generating weight matrix 252 in the illustrated embodiment matrix module 250 multiplies the weight matrix 252 by the feature vector matrix 232 to emphasize (or deemphasize) attributes of certain transactions in the training set 132. In various embodiments, the first matrix 142 generated by TopkPPR module 210 attempts to represent relationships between transactions occurring at a current node and remote transactions occurring at nodes multiple hops away in transaction network graph 122.

The techniques implemented by TopkPPR module 210 measure the relevance of nodes (e.g., user, consumers, merchants, etc.) in transaction network graph 122 with respect to a source node by observing relationships between transactions involving the source node and transactions occurring between nodes one or more nodes away from the source node. This type of transaction embedding may advantageously capture multi-hop transactions and, thus, improves classification accuracy (e.g., improves the rate at which fraudulent behavior is detected and prevented).

Neighborhood Module 220, in the illustrated embodiment, generates second matrix 144 based on training set 132 of transactions and matrix 232 of feature vectors. Neighborhood module 220, in the illustrated embodiment, includes anomaly module 260, label module 270, and aggregation module 280. Anomaly module 260 determines anomaly scores 262 for nodes in the transaction network graph 122 at which transactions in the training set 132 occur. For example, anomaly module 260 aggregates attributes for all transactions associated with a particular node on that node and repeats this process for each node in the transaction network graph that is associated with transactions in the training set 132. Then, anomaly module 260 determines, using a histogram-based outlier score (HBOS), numerical values (i.e., anomaly scores 262) for each attribute. These numerical values are stored the proper node based on the aggregated attributes of these nodes.

Label module 270, in the illustrated embodiment, assigns node labels 272 to different nodes in transaction network graph based on the anomaly scores 262 assigned to attributes aggregated on each node. For example, label module 270 selects nodes with the top HBOS scores (anomaly scores 262) and assigns node labels 272 indicating that these nodes are associated with anomalous behavior. As one specific example, a particular node may be labeled as "bad" with a label of 1, while nodes that are not associated with anomalous attributes according to their HBOS scores (anomaly scores 262) are labeled as "good" with a label of 0.

Aggregation module 280 aggregates attributes of transactions at different nodes based on their assigned anomaly scores 262. For example, aggregation module 280 combines, for a given node assigned an anomaly label (e.g., a node label of 1), attributes of transactions occurring at nodes within a neighborhood of nodes of the given node and attributes of transactions occurring at the given node. Further, aggregation module 280 combines, for a given node assigned an approved label (e.g., a node label of 0), attributes of transaction occurring at the approved labeled node.

The embedding performed by neighborhood module 220 attempts to account for anomalies in a particular entity's behavior based on behaviors of other entities that are similar (e.g., in the neighborhood of the particular entity). For example, if a particular user has attributes indicating that they are a pacific islander, that they participate in high dollar transactions, that they fund their transactions using a first type of currency, etc., and other similar users have attributes indicating that they are pacific islanders that participate is high dollar transactions, but that they fund their transactions using a second, different type of currency, then the particular user may be an anomalous user. More generally, the behavior of the particular user may be suspicious if they use a different currency from similar users located in the same geographic region as the particular user.

In some embodiments, the aggregation performed by module 280 combines a bunch of attributes for transactions in the neighborhood of nodes of a particular entity (represented by a particular node) so that a machine learning model trained based on transactions with combined attributes will more accurately account for anomalous behavior of the particular entity as indicated by its neighbors. Such techniques may be particularly advantageous due to anomalous users often repeating anomalous actions once they are successful.

In the illustrated embodiment, embedding module 140 sends first matrix 142 and second matrix 144 to combination module 160. Note that the actions performed by embedding module 140 are performed relative to transactions in training set 132. For example, when weighting module 240 generates weight values 242 for a node based on the number of transactions originating at this node, this process is looking at the number of training set transactions originating at this node (and, therefore, does not account for the number of testing set transactions originating at this node).

Turning now to FIG. 3, a diagram is shown illustrating an example transaction network graph. In the illustrated embodiment, transaction network graph 300 includes multiple different entities 306A-306G represented by nodes as well as a designated neighborhood 302 of nodes represented by a bounding box surrounding nodes 306E-306G (e.g., entities). FIG. 3 also includes a key 310 for the illustrated transaction network graph 300 indicating what the lines within the graph represent.

In the illustrated embodiment, the solid arrow represents a chain of transactions 304A that includes two hops, one between node 306A and node 306D and one between nodes 306D and 306C. Similarly, transactions 304B are represented by an evenly dashed line and include multiple hops, with a first hop from node 306C to node 306B, a second hop from node 306B to node 306E, a third hop from node 306E to node 306G, and a fourth hop from node 306G to node 306F. The hops, represented by arrows, from node to node in the transaction network graph 300 represent the movement of goods, services, money, etc. from one entity to another as part of transactions. In some situations, however, goods, services, money, etc. may flow in two directions for a given transaction.

In the context of FIG. 3 and as one specific example, the disclosed TopkPPR embedding techniques account for the behavior of entities participating in transactions two hops from node 306C. In this specific example, the TopkPPR techniques attempt to identify anomalous behavior in transaction initiated by node 306C based on transactions occurring between node 306E and 306G which are two hops away from transactions occurring at node 306C. This type of embedding may be thought of as a depth-first search, for example.

In the context of FIG. 3 and as one specific example, the disclosed neighborhood-based embedding techniques account for anomalies in the behavior of entities participating in transactions within a neighborhood of similar entities. For example, in the illustrated embodiment, neighborhood 302 of nodes encompassing nodes 306E, 306F, and 306G includes entities whose transactions have similar attributes. Using the disclosed neighborhood-based embedding techniques allows a machine learning model to be trained to identify various anomalous attributes in a given transaction. For example, based on the transaction attributes associated with node 306E differing from the transaction attributes associated with nodes 306F and 306G, a machine learning model may learn to identify the transaction initiated at node 306E as anomalous. This type of embedding may be thought of as a breadth-first search, for example.

Example Training and Validation

Figure 4A:
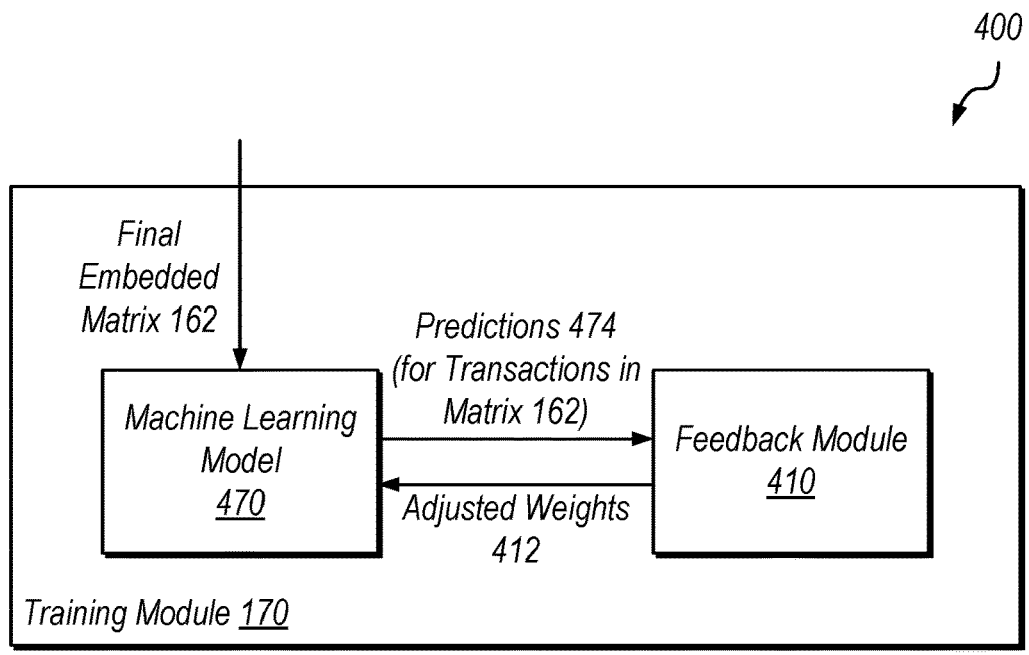
FIGS. 4A and 4B are block diagrams illustrating example training and verification of a machine learning model, respectively, according to some embodiments.
Figure 4B:
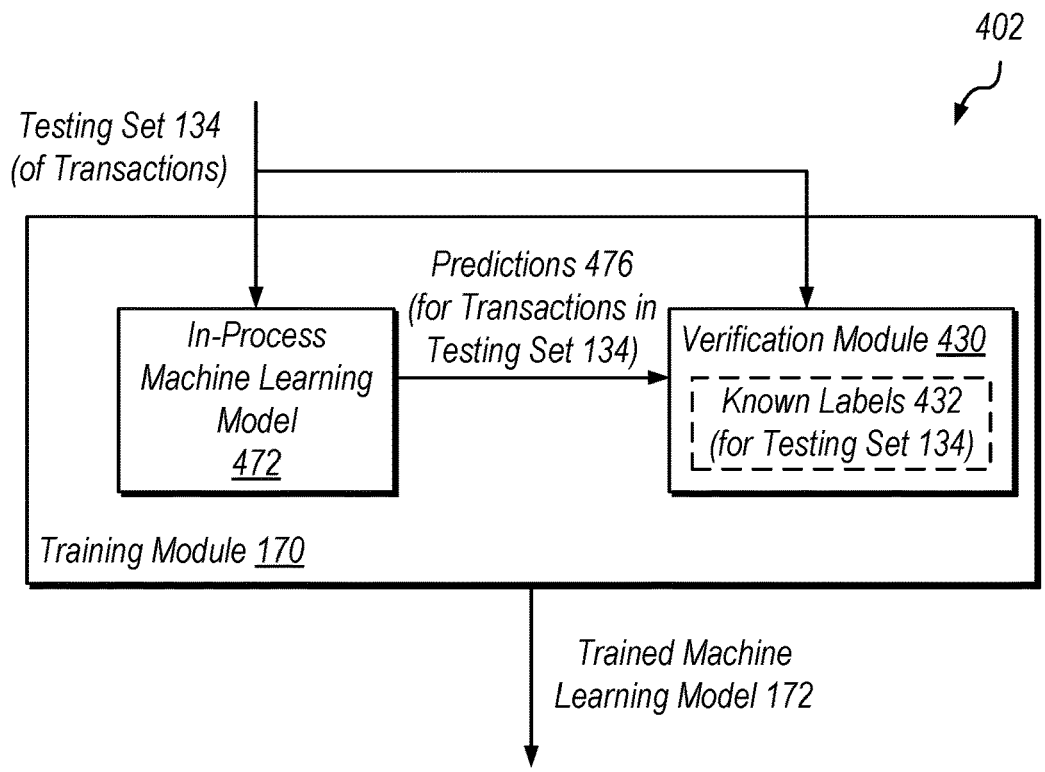

FIGS. 4A and 4B are block diagrams illustrating example training and verification of a machine learning model, respectively. In FIG. 4A, system 400 includes training module 170, which in turn includes a machine learning model 470 and a feedback module 410. In FIG. 4B, system 402 includes training module 170, which in turn includes an in-process machine learning model 472 and a verification module 430.

In FIG. 4A, training module 170 receives final embedded matrix 162 (e.g., from combination module 160 as shown in FIG. 1) and generates predictions 474 for transactions included in matrix 162. Predictions 474 are classifications indicating whether transactions in matrix 162 are suspicious or not. For example, model 470 may output a predicted classification of 0.8 on a scale of 0 to 1 (with 0 designating not suspicious and 1 designating suspicious), indicating that this transaction is most likely suspicious. Feedback module 410 evaluates predictions 474 by comparing them with known labels for corresponding transactions included in final embedded matrix 162.

Based on this evaluation, feedback module 410 provides adjusted weights 412 to machine learning model 470. For example, if a majority of the predictions 474 output by model 470 for transactions included in final embedded matrix 162 (e.g., embedded versions of transactions in training set 132) differ from known labels for transactions in matrix 162, then feedback module 410 adjust weights of model 470 accordingly. In some embodiments, feedback module 410 does not adjust weights. For example, if machine learning model 470 outputs a predicted classification of 0.9 for a particular transaction whose known label is 1, then feedback module 410 may not adjust weights of the model due to the model's predictions being close to known labels (because the model is providing accurate predictions). Once feedback module 410 is satisfied with the predictions 474 output by model 470 (e.g., the predictions satisfy a similarity threshold when compared to known labels), training module 170 performs a verification process on the in-process machine learning model 472 as shown in FIG. 4B.

In FIG. 4B, training module 170 receives testing set 134 of transactions (e.g., from separation module 130). Training module 170, in the illustrated embodiment, inputs the testing set 134 of transactions into in-process machine learning model 472 and observes predictions 476 output by model 472 for transactions in testing set 134. Predictions 476 are classifications indicating whether transactions in testing set 134 are suspicious or not. Verification module 430 compares predictions 476 for transactions in testing set 134 with known labels 432 for transactions in testing set 134. If verification module 430 determines that the similarity between predictions 476 match known labels 432 satisfy a similarity threshold, then training module 170 outputs trained machine learning model 172. Otherwise, training module 170 performs additional training as shown in FIG. 4A.

In some embodiments, training module 170 performs further verification of the in-process machine learning model 472 by comparing output of this model with other machine learning models trained using similar training techniques. For example, training module 170 might train several different types of machine learning models using the disclosed techniques and then select the model that performs the best according to the verification process shown in FIG. 4B. When selecting the model that performs best, module 170 will observe which predictions 476 output by each model are the most similar to known labels for transactions in the testing set 134.

Example Methods

FIG. 5 is a flow diagram illustrating a method 500 for training a machine learning model using embedded transaction data, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, computer system 110 performs the elements of method 500.

At 510, in the illustrated embodiment, a computer system generates a transaction network graph from an initial set of transactions with transaction attributes, where transactions in the initial set of transactions include known labels. In some embodiments, the transaction network graph includes a plurality of nodes representing multiple different entities involved in the initial set of transactions. In some embodiments, the transaction network graph includes a plurality of edges connecting one or more pairs of nodes included in the plurality of nodes, where the edges represent electronic transactions between the multiple different entities. For example, the nodes are vertices representing consumers, merchants, etc. while the edges are transactions that occurred between the consumers, merchants, etc.

At 520, the computer system generates, from a training set of transactions using a first graph embedding routine, a first transaction matrix, where the first graph embedding routine is based on anomalies in related transactions occurring at one or more nodes in the transaction network graph that are one or more hops away. In some embodiments, the training set includes a first subset of transactions in the transaction network graph.

In some embodiments, generating the first transaction matrix includes determining based on a number of transactions in the training set occurring at respective nodes of the transaction network graph, weight values for the nodes. In some embodiments, generating the first transaction matrix further includes generating, based on the determining, a weighting matrix for the training set of transactions, where rows of the weighting matrix represent source nodes of respective transactions in the training set. In some embodiments, the columns of the weighting matrix represent destination nodes of respective transactions in the training set. In some embodiments, generating the first transaction matrix further includes multiplying the weighting matrix by a feature vector matrix of the training set of transactions, where the feature vector matrix includes feature vectors generated by preprocessing attributes of transactions in the training set. For example, the first transaction matrix attempts to represent relationships between transactions occurring at a current node and transactions occurring at a node that is multiple hops away from the current transaction in the transaction network graph.

At 530, the computer system generates, from the training set of transactions using a second, different graph embedding routine, a second transaction matrix, where the second, different graph embedding routine is based on anomalies in neighborhoods of similar transactions. In some embodiments, generating the second transaction matrix includes determining anomaly scores for a plurality of nodes in the transaction network graph at which transactions in the training set occur. In some embodiments, generating the second transaction matrix further includes assigning, based on the determined anomaly scores, labels to the plurality of nodes at which transactions in the training set occur. In some embodiments, generating the second transaction matrix further includes aggregating, for a given node assigned an anomaly label, attributes of transactions occurring at nodes within a neighborhood of nodes of the anomaly labeled node and attributes of transactions occurring at the anomaly labeled node. In some embodiments, generating the second transaction matrix further includes aggregating, for a given node assigned an approved label, attributes of transactions occurring at the approved labeled node.

In some embodiments, the first graph embedding routine is a top k personalized page rank (TopkPPR) embedding routine and the second graph embedding routine is a neighborhood-based embedding routine, where the neighborhood-based embedding routine is further based on anomalies in transaction attributes in neighborhoods of similar transactions. In some embodiments, the related transactions occurring at one or more nodes in the transaction network graph that are multiple hops away have at least one shared attribute, where the at least one shared attribute is a node in the transaction network graph. In some embodiments, the similar transactions in the neighborhoods of similar transactions have multiple shared attributes. For example, related transactions share at least one node in the transaction graph, while similar transactions in a neighborhood share the same or substantially the same attributes (e.g., a transaction in a neighborhood of transactions may share a geography location of Europe, currency type, language, etc.).

In some embodiments, the first transaction matrix and the second transaction matrix are generated based on a matrix of feature vectors of respective transactions included in the training set of transactions. In some embodiments, generating the matrix of feature vectors includes preprocessing attributes of transactions included in the training set of transactions, where the preprocessing includes implementing a first data transformation routine for numerical attributes and implementing a second, different data transformation routine for categorical attributes.

At 540, the computer system generates a final embedded matrix from the first transaction matrix and the second transaction matrix, where one or more attributes of transactions in the final embedded matrix differ from attributes of corresponding transactions in the training set of transactions.

At 550, the computer system trains using the final embedded matrix and a testing set of transactions that includes a second, different subset of transactions in the transaction network graph, a machine learning model. In some embodiments, the training set of transactions and the testing set of transactions are selected from the transaction network graph based on transaction timestamps. Transactions in the training set are typically selected such that they have earlier timestamps than transactions in the testing set of transactions, for example.

At 560, the computer system determines, using the trained machine learning model, whether one or more unlabeled transactions are anomalous. In some embodiments, the training includes inputting the final embedded matrix into the machine learning model. In some embodiments, the training further includes adjusting, based output of the machine learning model for transactions in the final embedded matrix, weights of the model. In some embodiments, the training further includes verifying the machine learning model after adjusting weights of the model, wherein the verifying includes comparing output of the model for transactions in the testing set of transactions with known labels for transactions in the testing set.

FIG. 6 is a flow diagram illustrating a method 600 for using a machine learning model trained using embedded transaction data, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, computer system 110 performs the elements of method 600. In other embodiments, a different system than computer system 110 performs the elements of method 600. For example, computer system 110 may train a machine learning model according to elements 510-550 of method 500 and then another system may execute the trained machine learning model according to method 600 to detect anomalous behavior. Said another way, a first system may train a machine learning model and a second, different system may use the trained model to classify transactions as discussed below with reference to FIG. 6.

At 610, in the illustrated embodiment, a computer system determines, using a trained machine learning model, whether one or more unlabeled transactions are anomalous. As discussed above another computer system may train the machine learning model according to elements 620-660, discussed in detail below.

At 620, the machine learning model is trained by generating a transaction network graph from an initial set of transactions with transaction attributes, where transactions in the initial set of transactions include known labels. For example, a first transaction in the initial set of transactions has a known label of 1 (e.g., indicating the transaction is fraudulent), while a second, different transaction in the initial set of transactions has a known label of 0 (e.g., indicating the transaction is not fraudulent).

At 630, the machine learning model is further trained by generating from a training set of transactions using a first graph embedding routine, a first transaction matrix, where the first graph embedding routine is based on anomalies in related transactions occurring at one or more nodes in the transaction network graph that are multiple hops away. In some embodiments, the training set includes a first subset of transactions in the transaction network graph.

At 640, the machine learning model is further trained by generating from the training set of transactions using a second, different graph embedding routine, a second transaction matrix. In some embodiments, the second, different graph embedding routine is based on anomalies in neighborhoods of similar transactions.

At 650, the machine learning model is further trained by generating a final embedded matrix from the first transaction matrix and the second transaction matrix. In some embodiments, one or more attributes of transactions in the final embedded matrix differ from the attributes of corresponding transactions in the training set of transactions.

At 660, the machine learning model is further trained by inputting the final embedded matrix into the machine learning model and adjusting weights of the model based on output of the model for the final embedded matrix. In some embodiments, training of the machine learning model is verified after adjustment of its weights by inputting the testing set of transactions into the adjusted model and comparing predictions for transactions output by the adjusted model with known labels for corresponding transactions in the testing set of transactions.

Example Computing Device

Figure 7:
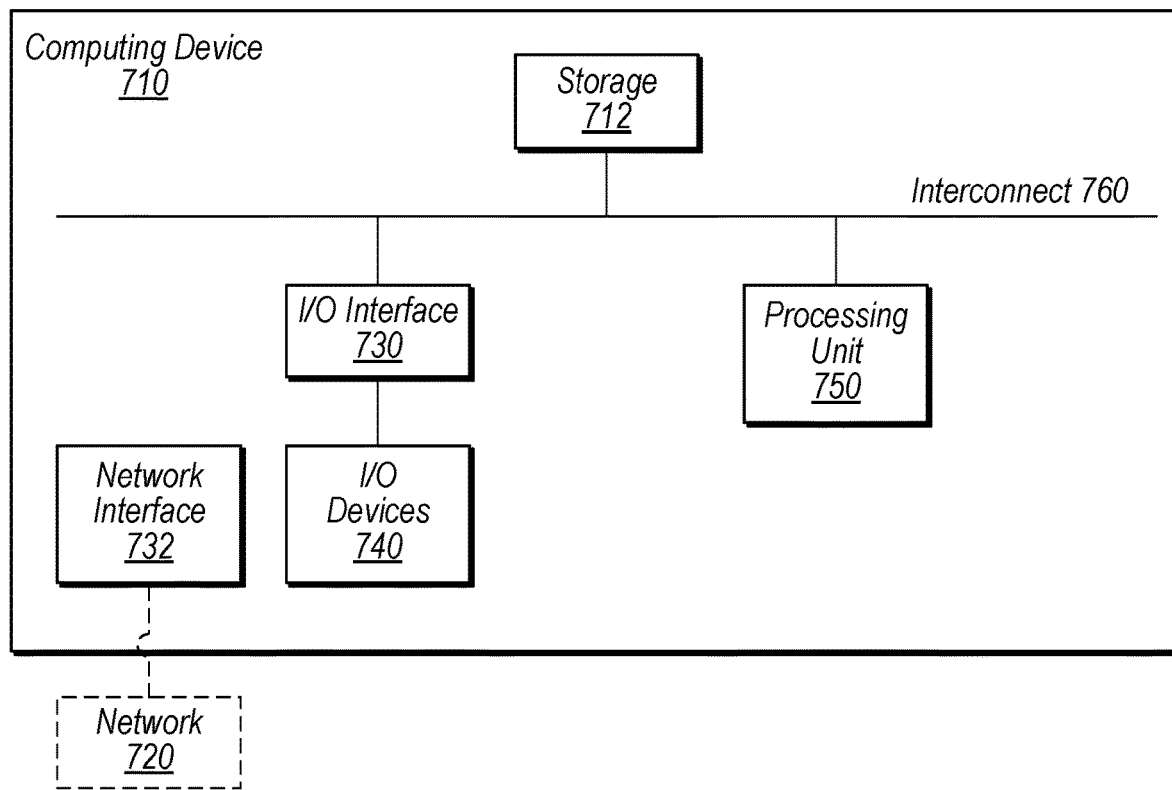
FIG. 7 is a block diagram illustrating an example computing device, according to some embodiments.

Turning now to FIG. 7, a block diagram of one embodiment of computing device (which may also be referred to as a computing system) 710 is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. The computing system 110 shown in FIG. 1 and discussed above is one example of computing device 710. As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 712 may consist solely of volatile memory, in one embodiment. Database 150, discussed above with reference to FIG. 1 is one example of storage subsystem 712. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
    generating, by a computer system, a transaction network graph from an initial set of transactions with transaction attributes, wherein transactions in the initial set of transactions include known labels;
    generating, by the computer system from a training set of transactions using a first graph embedding routine, a first transaction matrix, wherein the first graph embedding routine is based on anomalies in related transactions occurring at one or more nodes in the transaction network graph that are one or more hops away, and wherein the training set includes a first subset of transactions in the transaction network graph;
    generating, by the computer system from the training set of transactions using a second, different graph embedding routine, a second, different transaction matrix, wherein the second, different graph embedding routine is based on anomalies in neighborhoods of similar transactions that have multiple shared attributes, and wherein generating the second, different matrix includes aggregating, for a given node assigned an anomaly label, attributes of transactions occurring at nodes within a neighborhood of nodes of the anomaly labeled node and attributes of transactions occurring at the anomaly labeled node;
    generating, by the computer system, a final embedded matrix from the first transaction matrix and the second, different transaction matrix, wherein one or more attributes of transactions in the final embedded matrix differ from attributes of corresponding transactions in the training set of transactions;
    training, by the computer system using the final embedded matrix and a testing set of transactions that includes a second, different subset of transactions in the transaction network graph, a machine learning model;
    determining, by the computer system using the trained machine learning model, whether one or more unlabeled transactions are anomalous; and
    in response to determining that at least one of the one or more unlabeled transactions are anomalous, rejecting the transaction.

2. The method of claim 1, wherein the transaction network graph includes:
    a plurality of nodes representing multiple different entities involved in the initial set of transactions; and
    a plurality of edges connecting one or more pairs of nodes included in the plurality of nodes, wherein the edges represent electronic transactions between the multiple different entities.

3. The method of claim 1, wherein generating the first transaction matrix includes:
    determining based on a number of transactions in the training set occurring at respective nodes of the transaction network graph, weight values for the nodes;
    generating, based on the determining, a weighting matrix for the training set of transactions, wherein rows of the weighting matrix represent source nodes of respective transactions in the training set, and wherein columns of the weighting matrix represent destination nodes of respective transactions in the training set; and
    multiplying the weighting matrix by a feature vector matrix of the training set of transactions, wherein the feature vector matrix includes feature vectors generated by preprocessing attributes of transactions in the training set.

4. The method of claim 1, wherein generating the second transaction matrix includes:
    determining anomaly scores for a plurality of nodes in the transaction network graph at which transactions in the training set occur;
    assigning, based on the determined anomaly scores, labels to the plurality of nodes at which transactions in the training set occur; and
    aggregating, for a given node assigned an approved label, attributes of transactions occurring at the approved labeled node.

5. The method of claim 1, wherein the first graph embedding routine is a top k personalized page rank (TopkPPR) embedding routine, wherein the second graph embedding routine is a neighborhood-based embedding routine, and wherein the neighborhood-based embedding routine is further based on anomalies in transaction attributes in neighborhoods of similar transactions.

6. The method of claim 1, wherein the related transactions having at least one shared attribute and occurring at one or more nodes in the transaction network graph that are multiple hops away are connected to one another in the transaction network graph by a chain of one or more transactions.

7. The method of claim 1, wherein the first transaction matrix and the second transaction matrix are generated based on a matrix of feature vectors of respective transactions included in the training set of transactions, wherein generating the matrix of feature vectors includes:
preprocessing attributes of transactions included in the training set of transactions, wherein the preprocessing includes implementing a first data transformation routine for numerical attributes and implementing a second, different data transformation routine for categorical attributes.

8. The method of claim 1, wherein the training set of transactions and the testing set of transactions are selected from the transaction network graph based on transaction timestamps.

9. The method of claim 1, wherein the training includes:
inputting the final embedded matrix into the machine learning model;
adjusting, based output of the machine learning model for transactions in the final embedded matrix, weights of the model; and
verifying the machine learning model after adjusting weights of the model, wherein the verifying includes comparing output of the model for transactions in the testing set of transactions with known labels for transactions in the testing set.

10. A non-transitory computer-readable medium having program instructions stored thereon that are executable by a computer system to perform operations comprising:
generating a transaction network graph from an initial set of transactions with transaction attributes, wherein transactions in the initial set of transactions include known labels;
generating, from a training set of transactions using a top k personalized page rank (TopkPPR) graph embedding routine, a first transaction matrix, wherein the TopkPPR routine is based on anomalies in related transactions occurring at one or more nodes in the transaction network graph that are multiple hops away, and wherein the training set includes a first subset of transactions in the transaction network graph;
generating, from the training set of transactions using a neighborhood-based graph embedding routine, a second transaction matrix, wherein the neighborhood-based routine is based on anomalies in neighborhoods of similar transactions, and wherein generating the second transaction, matrix includes aggregating, for a given node assigned an anomaly label, attributes of transactions occurring at nodes within a neighborhood of nodes of the anomaly labeled node and attributes of transactions occurring at the anomaly labeled node;
generating a final embedded matrix from the first transaction matrix and the second transaction matrix, wherein one or more attributes of transactions in the final embedded matrix differ from the attributes of corresponding transactions in the training set of transactions;
training, using the final embedded matrix and a testing set of transactions that includes a second, different subset of transactions in the transaction network graph, a machine learning model; and
storing the trained machine learning model usable by transaction processing systems to identify anomalous transactions.

11. The non-transitory computer-readable medium of claim 10, wherein the transaction network graph includes:
a plurality of nodes representing multiple different entities involved in the initial set of transactions; and
a plurality of edges connecting one or more pairs of nodes included in the plurality of nodes, wherein the edges represent electronic transactions between the multiple different entities.

12. The non-transitory computer-readable medium of claim 10, wherein generating the first transaction matrix includes:
determining based on a number of transactions in the training set occurring at respective nodes of the transaction network graph, weight values for the nodes;
generating, based on the determining, a weighting matrix for the training set of transactions, wherein rows of the weighting matrix represent source nodes of respective transactions in the training set, and wherein columns of the weighting matrix represent destination nodes of respective transactions in the training set; and
multiplying the weighting matrix by a feature vector matrix of the training set of transactions, wherein the feature vector matrix includes feature vectors generated by preprocessing attributes of transactions in the training set.

13. The non-transitory computer-readable medium of claim 10, wherein generating the second transaction matrix includes:
determining anomaly scores for a plurality of nodes in the transaction network graph at which transactions in the training set occur;
assigning, based on the determined anomaly scores, labels to the plurality of nodes at which transactions in the training set occur; and
aggregating, for a given node assigned an approved label, attributes of transactions occurring at the approved labeled node.

14. The non-transitory computer-readable medium of claim 10, wherein the related transactions occurring at one or more nodes in the transaction network graph that are multiple hops away are connected to one another in the transaction network graph by a chain of one or more transactions, and wherein similar transactions in the neighborhoods of similar transactions have multiple shared attributes.

15. The non-transitory computer-readable medium of claim 10, wherein the training set of transactions and the testing set of transactions are selected from the transaction network graph based on timestamps of transactions included in the transaction network graph.

16. A system, comprising:
at least one processor; and
a memory having instructions stored thereon that are executable by the at least one processor to cause the system to:
determine, using a trained machine learning model, whether one or more unlabeled transactions are anomalous, wherein the machine learning model is trained by:
generating a transaction network graph from an initial set of transactions with transaction attributes, wherein transactions in the initial set of transactions include known labels;
generating, from a training set of transactions using a first graph embedding routine, a first transaction matrix, wherein the first graph embedding routine is based on anomalies in related transactions occurring at one or more nodes in the transaction network graph that are multiple hops away, and wherein the training set includes a first subset of transactions in the transaction network graph;

generating, from the training set of transactions using a second, different graph embedding routine, a second, different transaction matrix, wherein the second, different graph embedding routine is based on anomalies in neighborhoods of similar transactions, and wherein generating the second, different matrix includes aggregating, for a given node assigned an anomaly label, attributes of transactions occurring at nodes within a neighborhood of nodes of the anomaly labeled node and attributes of transactions occurring at the anomaly labeled node;

generating a final embedded matrix from the first transaction matrix and the second, different transaction matrix, wherein one or more attributes of transactions in the final embedded matrix differ from the attributes of corresponding transactions in the training set of transactions; and inputting the final embedded matrix into the machine learning model and adjusting weights of the model based on output of the model for the final embedded matrix.

17. The system of claim 16, wherein the transaction network graph includes:

a plurality of nodes representing multiple different entities involved in the initial set of transactions; and a plurality of edges connecting one or more pairs of nodes included in the plurality of nodes, wherein the edges represent electronic transactions between the multiple different entities.

18. The system of claim 16, wherein generating the first transaction matrix includes:

determining based on a number of transactions in the training set occurring at respective nodes of the transaction network graph, weight values for the nodes;

generating, based on the determining, a weighting matrix for the training set of transactions, wherein rows of the weighting matrix represent source nodes of respective transactions in the training set, and wherein columns of the weighting matrix represent destination nodes of respective transactions in the training set; and multiplying the weighting matrix by a feature vector matrix of the training set of transactions, wherein the feature vector matrix includes feature vectors generated by preprocessing attributes of transactions in the training set.

19. The system of claim 16, wherein generating the second transaction matrix includes:

determining anomaly scores for a plurality of nodes in the transaction network graph at which transactions in the training set occur;

assigning, based on the determined anomaly scores, labels to the plurality of nodes at which transactions in the training set occur; and aggregating, for a given node assigned an approved label, attributes of transactions occurring at the approved labeled node.

20. The system of claim 16, wherein the first transaction matrix and the second transaction matrix are generated based on a matrix of feature vectors of respective transactions included in the training set of transactions, wherein generating the matrix of feature vectors includes:

preprocessing attributes of transactions included in the training set of transactions, wherein the preprocessing includes implementing a first data transformation routine for numerical attributes and implementing a second, different data transformation routine for categorical attributes.

* * * * *